(12) United States Patent
Bourdoncle et al.

(10) Patent No.: US 7,427,134 B2
(45) Date of Patent: Sep. 23, 2008

(54) OPHTHALMIC LENS

(75) Inventors: Bernard Bourdoncle, Paris (FR); Bruno Decreton, Charenton Le-Pont (FR)

(73) Assignee: Essilor International (Compagnie General D'Optique), Charenton Cedex (FR)

( * ) Notice: Subject to any disclaimer, the term of this patent is extended or adjusted under 35 U.S.C. 154(b) by 321 days.

(21) Appl. No.: 11/450,913

(22) Filed: Jun. 9, 2006

(65) Prior Publication Data

US 2007/0121063 A1    May 31, 2007

(30) Foreign Application Priority Data

Nov. 29, 2005    (FR) .................................... 05 12063

(51) Int. Cl.
    *G02C 7/06*    (2006.01)
(52) U.S. Cl. ....................... 351/169; 351/177
(58) Field of Classification Search ................ 351/169, 351/177
    See application file for complete search history.

(56) References Cited

U.S. PATENT DOCUMENTS

| | | | |
|---|---|---|---|
| 4,854,689 A | 8/1989 | Dufour et al. |
| 5,270,745 A | 12/1993 | Pedrono |
| 5,272,495 A | 12/1993 | Pedrono |
| 5,488,442 A | 1/1996 | Harsigny et al. |
| 5,812,238 A | 9/1998 | Ahsbahs et al. |
| 5,949,519 A | 9/1999 | Le Saux et al. |
| 6,102,544 A | 8/2000 | Baudart et al. |
| 6,116,734 A | 9/2000 | Pedrono et al. |
| 6,260,967 B1 | 7/2001 | Edwards et al. |
| 6,318,859 B1 | 11/2001 | Baudart et al. |
| 6,382,789 B1 | 5/2002 | Baudart et al. |
| 6,540,354 B2 | 4/2003 | Chauveau et al. |
| 6,595,637 B2 | 7/2003 | Ahsbahs et al. |
| 6,595,638 B2 | 7/2003 | Ahsbahs et al. |

(Continued)

FOREIGN PATENT DOCUMENTS

EP    0 990 939    4/2000

(Continued)

OTHER PUBLICATIONS

W.N. Charman et al., "Astigmatism, accommodation, and visual instrumentation", *Applied Optics*, vol. 17, No. 24, pp. 3903-3910 (Dec. 15, 1978).

(Continued)

*Primary Examiner*—Jordan M Schwartz
(74) *Attorney, Agent, or Firm*—Fish & Richardson P.C.

(57) ABSTRACT

A progressive multifocal ophthalmic lens has a complex surface having a prism reference point, a fitting cross, a progression meridian having a power addition greater than or equal to 1.5 diopters. The lens has, under conditions when being worn:
  a reduced root mean square, normalized to the addition prescription, of less than 0.65 microns per diopter in a zone delimited by a circle centred on the prism reference point and with a diameter corresponding to a sweep of vision of 80°,
  a progression length of less than or equal to 25°, and
  a difference in normalized reduced root mean square between pairs of symmetrical points relative to a vertical axis passing through the fitting cross of less than 0.12 microns per diopter in a zone delimited by a semi-circle centred on the fitting cross and with a radius corresponding to raising viewing by 25°.

6 Claims, 10 Drawing Sheets

U.S. PATENT DOCUMENTS

| | | | |
|---|---|---|---|
| 6,652,096 B1 * | 11/2003 | Morris et al. | 351/169 |
| 6,682,194 B2 | 1/2004 | Ahsbahs et al. | |
| 6,793,340 B1 | 9/2004 | Morris et al. | |
| 7,052,133 B2 * | 5/2006 | Lindacher et al. | 351/161 |
| 7,066,597 B2 * | 6/2006 | Miller et al. | 351/169 |
| 2002/0171803 A1 | 11/2002 | Ahsbahs et al. | |
| 2002/0176048 A1 | 11/2002 | Ahsbahs et al. | |
| 2002/0180928 A1 | 12/2002 | Ahsbahs et al. | |
| 2003/0156251 A1 | 8/2003 | Welk et al. | |
| 2004/0263778 A1 * | 12/2004 | Wooley | 351/169 |

FOREIGN PATENT DOCUMENTS

| | | |
|---|---|---|
| FR | 2 683 642 | 5/1993 |
| FR | 2 699 294 | 6/1994 |
| FR | 2 704 327 | 10/1994 |
| FR | 2 770 000 | 4/1999 |
| GB | 2 277 997 | 11/1994 |
| WO | WO 98/12590 | 3/1998 |
| WO | WO 03/048841 | 6/2003 |

OTHER PUBLICATIONS

Rainer G. Dorsch et al., "Coma and Design Characteristics of Progressive Addition Lenses", *Vision Science and Its Applications*, Technical Digest Series vol. 1, Santa Fe, New Mexico pp. SaA3-1 / 68—SaA3-4 / 71(Feb. 6-9, 1998).

Eloy A. Villegas et al., "Spatially Resolved Wavefront Aberrations of Ophthalmic Progressive-Power Lenses in Normal Viewing Conditions", *Optometry and Vision Science*, vol. 80, No. 2, pp. 106-114 (Feb. 2003).

* cited by examiner

OPHTHALMIC LENS

CROSS REFERENCE TO RELATED APPLICATIONS

Pursuant to U.S.C. § 119, this application claims the benefit of French Patent Application 05 12 063, filed Nov. 29, 2005. The contents of the prior application is incorporated herein by reference in its entirety.

TECHNICAL FIELD

This invention relates to an ophthalmic lens.

BACKGROUND

Any ophthalmic lens intended to be held in a frame involves a prescription. The ophthalmic prescription can include a positive or negative power prescription as well as an astigmatism prescription. These prescriptions correspond to corrections enabling the wearer of the lenses to correct defects of his vision. A lens is fitted in the frame in accordance with the prescription and with the position of the wearer's eyes relative to the frame.

In the simplest cases, the prescription is nothing more than a power prescription. The lens is said to be unifocal and has a rotational symmetry. It is fitted in a simple manner in the frame so that the principal viewing direction of the wearer coincides with the axis of symmetry of the lens.

For presbyopic wearers, the value of the power correction is different for far vision and near vision, due to the difficulties of accommodation in near vision. The prescription thus comprises a far-vision power value and an addition (or power progression) representing the power increment between far vision and near vision; this comes down to a far-vision power prescription and a near-vision power prescription. Lenses suitable for presbyopic wearers are progressive multifocal lenses; these lenses are described for example in FR-A-2 699 294, U.S. Pat. No. 5,270,745 or U.S. Pat. No. 5,272,495, FR-A-2 683 642, FR-A-2 699 294 or also FR-A-2 704 327. Progressive multifocal ophthalmic lenses include a far-vision zone, a near-vision zone and an intermediate-vision zone, a principal progression meridian crossing these three zones. They are generally determined by optimization, based on a certain number of constraints imposed on the different characteristics of the lens. These lenses are all-purpose lenses in that they are adapted to the different needs of the wearer at the time.

Families of progressive multifocal lenses are defined, each lens of a family being characterized by an addition which corresponds to the power variation between the far-vision zone and the near-vision zone. More precisely, the addition, referenced A, corresponds to the power variation between a point FV of the far-vision zone and a point NV of the near-vision zone, which are respectively called far-vision control point and near-vision control point, and which represent the points of intersection of viewing with the surface of the lens for far distance vision and for reading vision.

In one family of lenses the addition varies from one lens to the other in the family between a minimum addition value and a maximum addition value of 0.25 diopter and by 0.25 diopter from one lens to the other in the family.

Lenses with the same addition differ in the value of the mean sphere at a reference point, also called a base. It is possible to choose for example to measure the base at the point FV for measuring far vision. Thus the choice of a pair (addition, base) defines a group or set of aspherical front faces for progressive multifocal lenses. Generally, it is thus possible to define 5 base values and 12 addition values, i.e. sixty front faces. In each of the bases an optimization is carried out for a given power. Starting from semi-finished lenses, of which only the front face is formed, this known method makes it possible to prepare lenses suited to each wearer, by simple machining of a spherical or toric rear face.

Progressive multifocal lenses thus usually comprise an aspherical front face, which is the face away from the person wearing the glasses and a rear spherical or toric face directed towards the person wearing the glasses. This spherical or toric face allows the lens to be adapted to the user's ametropia, so that a progressive multifocal lens is generally defined only by its aspherical surface. As is well known, an aspherical surface is generally defined by the altitude of all of its points. The parameters constituted by the minimum and maximum curvatures at each point are also used, or more commonly their half-sum and their difference. This half-sum and this difference multiplied by a factor n−1, n being the refractive index of the lens material, are called mean sphere and cylinder.

A progressive multifocal lens can thus be defined, at every point on its complex surface, by geometric characteristics including a mean sphere value and a cylinder value, given by the following formulae.

In a manner known per se, at any point of a complex surface, a mean sphere D given by the formula:

$$D = \frac{n-1}{2}\left(\frac{1}{R_1} + \frac{1}{R_2}\right)$$

is defined, where $R_1$ and $R_2$ are the maximum and minimum local radii of curvature expressed in meters, and n is the index of the material constituting the lens.

A cylinder C, given by the formula:

$$C = (n-1)\left|\frac{1}{R_1} - \frac{1}{R_2}\right|,$$

is thus defined.

The characteristics of the complex face of the lens can be expressed using the mean sphere and the cylinder.

Moreover, a progressive multifocal lens can also be defined by optical characteristics taking into account the situation of the wearer of the lenses. In fact, the laws of the optics of ray tracings mean that optical defects appear when the rays deviate from the central axis of any lens. Conventionally, the aberrations known as power defects and astigmatism defects are considered. These optical aberrations can be generically called obliquity defects of rays.

Obliquity defects of rays have already been clearly identified in the prior art and improvements have been proposed. For example, the document WO-A-98 12590 describes a method for determination by optimization of a set of progressive multifocal ophthalmic lenses. This document proposes defining the set of lenses in consideration of the optical characteristics of the lenses and in particular the wearer power and oblique astigmatism under wearing conditions. The lens is optimized by ray tracing, using an ergorama linking a target object point with each direction of viewing under wearing conditions.

EP-A-0 990 939 also proposes to determine a lens by optimization taking into account the optical characteristics instead of the surface characteristics of the lens. For this purpose the characteristics of an average wearer are considered, in particular as regards the position of the lens in front of the eye of the wearer in terms of curving contour, pantoscopic angle and lens-eye distance.

It is thus possible to consider, in addition to the obliquity defects of rays described previously, the so-called higher order optical aberration such as spherical aberrations or coma by studying the deformations which are undergone by a non-aberrant spherical wave front passing through the lens.

It is considered that the eye rotates behind the lens in order to sweep over all of its surface. Thus, at each point, an optical system composed of the eye and the lens is considered, as will be explained in detail below with reference to FIGS. 1 to 3. The optical system is therefore different at each point of the surface of the lens because the relative positions of the principle axis of the eye and of the lens are in fact different at each point due to the rotation of the eye behind the lens.

In each of these successive positions, the aberrations undergone by the wave front which passes through the lens and is limited by the pupil of the eye are calculated.

The spherical aberration results for example from the fact that the rays which pass at the edge of the pupil do not converge in the same plane as the rays which pass close to its centre. Moreover, the coma represents the fact that the image of a point situated outside the axis has a tail, due to the power variation of the optical system. Reference can be made to the article by R. G. Dorsch and P. Baumbach, "Coma and Design Characteristics of Progressive Addition Lenses" R. G. Dorsch, P. Baumbach, Vision Science and Its Applications, Santa Fe, February 1998 which describes the effects of coma on a progressive multifocal lens.

SUMMARY

The deformations of the wave front passing through the multifocal lens can be described in a global manner by the root mean square or RMS. The RMS is generally expressed in microns (μm) and, for each point on the complex surface, indicates the difference in the resulting wave front relative to a non-aberrant wave front. The invention proposes controlling the RMS value in order to determine a progressive multifocal lens defined by its optical characteristics under wearing conditions in order to limit the optical aberrations perceived by the eye.

In particular when the progressive multifocal lens has a large power addition, for example greater than or equal to 1.5 diopters, the aberrations affecting the wave front become more significant due to the power progression between the far-vision zone and the near-vision zone. These optical aberrations perceived by the wearer adversely affect the comfort in peripheral vision and in dynamic vision. A need therefore exists for a progressive multifocal lens which better satisfies the needs of wearers.

The invention proposes a progressive multifocal lens which is easier to adapt to than the standard ophthalmic lenses; it has a very smooth power progression in order to provide the wearer with excellent perception in dynamic vision and in peripheral vision. It is proposed to limit the RMS over the whole of a central zone of the lens while guaranteeing good accessibility to the powers required in near vision. Such a lens is particularly suitable for the comfort of hypermetropic wearers who require a large power addition, greater than or equal to 1.5 diopters.

Consequently, the invention proposes a progressive multifocal ophthalmic lens with a complex surface having:
a prism reference point;
a fitting cross situated 8° above the prism reference point;
a substantially umbilical progression meridian having a power addition greater than or equal to 1.5 diopters between a far-vision reference point and a near-vision reference point;

the lens having, under wearing conditions and with reference to a plane prescription in far vision by adjustment of the radii of curvature of at least one of its faces:
a reduced root mean square, normalized to the addition prescription, of less than 0.65 microns per diopter, in a zone delimited by a circle centred on the prism reference point and with a diameter corresponding to a sweep of vision of 80°, the reduced root mean square being calculated by cancelling the coefficients of the order of 1 and the coefficient of the order of 2 corresponding to the defocusing in the decomposition into Zernicke polynomials of a wave front passing through the lens;
a progression length less than or equal to 25°, the progression length being defined as the angle of lowered vision from the fitting cross to the point on the meridian at which the wearer's optical power reaches 85% of the addition prescription;
a normalized reduced root mean square difference of less than 0.12 microns per diopter calculated in absolute values as the difference in root mean square values between pairs of symmetrical points relative to a vertical axis passing through the fitting cross, in a zone which includes the far-vision control point and delimited by a semi-circle centred on the fitting cross and with a radius corresponding to a raised viewing of 25°.

According to one characteristic, the root mean square difference between two symmetrical points in said semi-circle is less than or equal to 0.12 microns per diopter below a substantially horizontal line situated 8° above the fitting cross.

According to one characteristic, the semi-circle has a base which is substantially horizontal passing through the fitting cross.

According to one characteristic, the axis of symmetry of the semi-circle substantially coincides with the progression meridian.

The invention also relates to a visual device including at least one lens according to the invention and a method for correcting the vision of a presbyopic subject, which comprises providing the subject with, or the wearing by the subject of, such a device.

DESCRIPTION OF DRAWINGS

Other advantages and characteristics of the invention will become apparent on reading the following description of the embodiments of the invention, given by way of example and with reference to the drawings which show.

DETAILED DESCRIPTION

Figure 1:
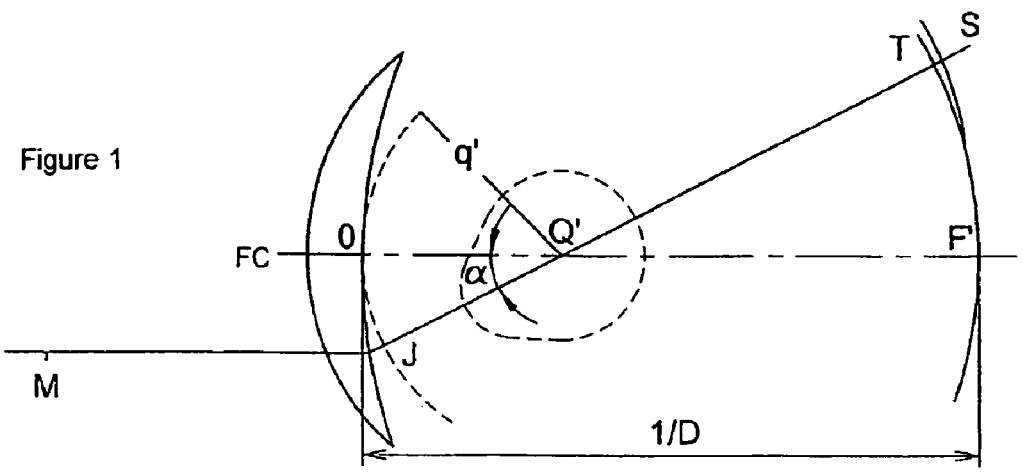
FIG. 1, a diagram of an eye-lens optical system, top view.

In a conventional manner, for a given lens, characteristic optical variables are defined, namely a power and an astigmatism, under conditions when being worn. FIG. 1 shows a diagram of an eye-and-lens optical system in a side view, and shows the definitions used hereafter in the description. The centre of rotation of the eye is called Q'; the axis Q'F' represented in the figure by a chain-dotted line is the horizontal axis passing through the centre of rotation of the eye and continuing in front of the wearer—in other words the axis Q'F' corresponds to the primary viewing direction. This axis cuts, on the front face, a point on the lens called the fitting cross FC, which is marked on the lenses in order to allow their positioning by an optician. The fitting cross is generally situated 4 mm above the geometrical centre of the front face. Let point O be the point of intersection of the rear face and this axis Q'F'. A sphere of the vertices is defined, with a centre Q', and a radius q', which cuts the rear face of the lens at the point O. By way of example, a radius q' value of 27 mm corresponds to a current value and produces satisfactory results when the lenses are worn. The section of the lens can be drawn in the plane (O, x, y) which is defined with reference to FIG. 2. The tangent to this curve at the point O is inclined relative to the axis (O, y) at an angle called the pantoscopic angle. The value of the pantoscopic angle is currently 8°. The section of the lens can also be drawn in the plane (O, x, z). The tangent to this curve at the point O is inclined relative to the axis (O, z) at an angle called the curving contour. The value of the curving contour is currently 0°.

A given viewing direction—represented by a solid line in FIG. 1—corresponds to a position of the eye in rotation about Q' and to a point J on the sphere of the vertices; a viewing direction can also be marked, in spherical coordinates, by two angles $\alpha$ and $\beta$. The angle $\alpha$ is the angle formed between the axis Q'F' and the projection of the straight line Q'J over the horizontal plane containing the axis Q'F'; this angle appears in the diagram of FIG. 1. The angle $\beta 0$ is the angle formed between the axis Q'F' and the projection of the straight line Q'J over the vertical plane containing the axis Q'F'. A given viewing direction therefore corresponds to a point J of the sphere of the vertices or to a pair $(\alpha, \beta)$.

In a given viewing direction, the image of a point M in the object space situated at a given object distance forms between two points S and T corresponding to minimum and maximum distances JS and JT (which are sagittal and tangential focal distances in the case of revolution surfaces, and of a point M at infinity). The angle $\gamma$ marked as the axis of astigmatism is the angle formed by the image corresponding to the smallest distance with the axis $(z_m)$, in the plane $(z_m, y_m)$ defined with reference to FIGS. 2 and 3. The angle $\gamma$ is measured in counterclockwise direction when looking at the wearer. In the example of FIG. 1, on the axis Q'F', the image of a point of the object space at infinity forms at the point F'; the points S and T coincide, which is another way of saying that the lens is locally spherical in the primary viewing direction. The distance D is the rear front end of the lens.

Figure 2:
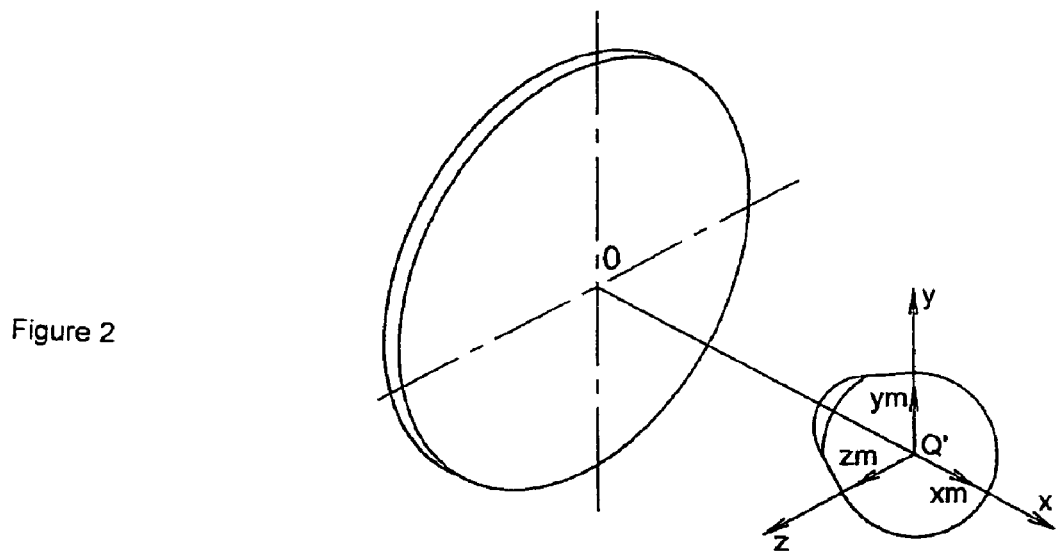
FIGS. 2 and 3, perspective diagrams of an eye-lens system.
Figure 3:
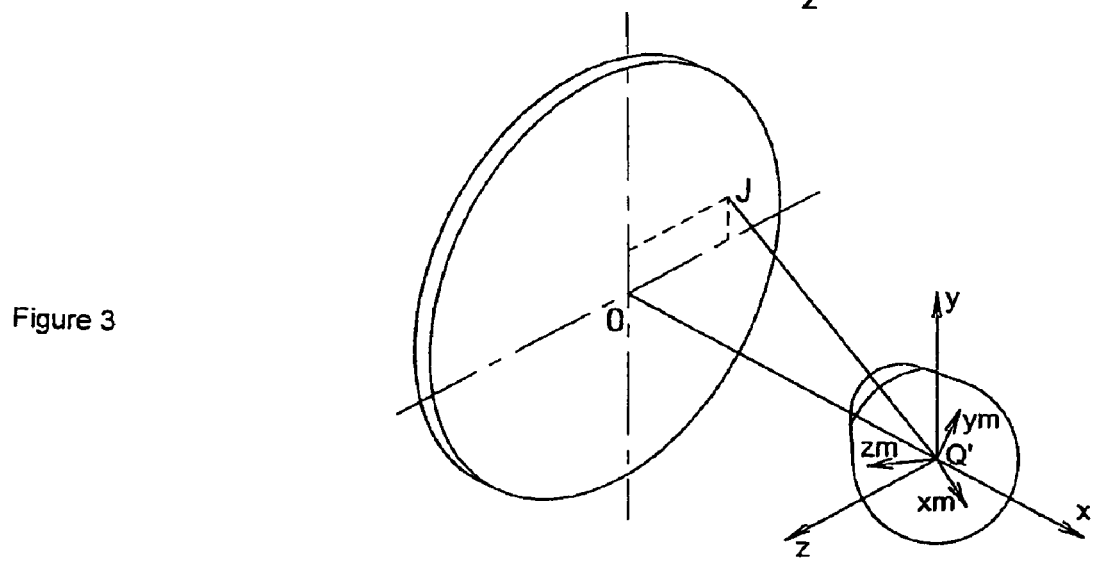

FIGS. 2 and 3 show perspective diagrams of an eye-lens system. FIG. 2 shows the position of the eye and of the reference frame linked to the eye, in the principal viewing direction, $\alpha = \beta = 0$, called the primary viewing direction. The points J and O thus coincide. FIG. 3 shows the position of the eye and of the reference frame which is linked to it in one direction $(\alpha, \beta)$. In FIGS. 2 and 3 a fixed reference frame $\{x, y, z\}$ and a reference frame $\{x_m, y_m, z_m\}$ linked to the eye are represented, in order to show the rotation of the eye clearly. The origin of the reference frame $\{x, y, z\}$ is the point Q'; the axis x is the axis Q'F'—the point F' is not represented in FIGS. 2 and 3 and passes through the point O; this axis is orientated from the lens towards the eye, in agreement with the direction of measurement of the axis of astigmatism. The plane $\{y, z\}$ is the vertical plane; the y axis is vertical and orientated upwards; the z axis is horizontal, the reference frame being directly orthonormalized. The reference frame $\{x_m, y_m, z_m\}$ linked to the eye has the point Q' as its centre; the axis $x_m$ is given by the direction JQ' of viewing, and coincides with the reference frame $\{x, y, z\}$ for the primary direction of viewing. Listing's law gives the relationships between the coordinate systems $\{x, y, z\}$ and $\{x_m, y_m, z_n\}$, for each direction of viewing, see Legrand, *Optique Physiologique*, Volume 1, Edition de la Revue d'Optique, Paris 1965.

Using these data, an optical power of the wearer and an astigmatism can be defined in each viewing direction. For a viewing direction $(\alpha, \beta)$, an object point M at an object distance given by the ergorama is considered. The points S and T between which the image of the object forms are determined. The image proximity IP is then given by $$IP = \frac{1}{2}\left(\frac{1}{JT} + \frac{1}{JS}\right)$$

while the object proximity OP is given by $$OP = \frac{1}{MJ}$$

The power is defined as the sum of the object and image proximities, i.e.

$$P = OP + IP = \frac{1}{MJ} + \frac{1}{2}\left(\frac{1}{JT} + \frac{1}{JS}\right)$$

The amplitude of the astigmatism is given by $$A = \left|\frac{1}{JT} - \frac{1}{JS}\right|$$

The angle of the astigmatism is the angle $\gamma$ defined above: it is the angle measured in a reference frame linked to the eye, relative to the direction $z_m$, with which the image T forms, in the plane $(z_m, y_m)$. These definitions of power and of astigmatism are optical definitions, under wearing conditions and in a reference frame linked to the eye. Qualitatively, the thus-defined power and astigmatism correspond to the characteristics of a thin lens, which, fitted instead of the lens in the viewing direction, provides the same images locally. It is noted that, in the primary viewing direction, the definition provides the standard value of the astigmatism prescription. Such a prescription is produced by the ophthalmologist, in far vision, in the form of a pair formed by an axis value (in degrees) and an amplitude value (in diopters).

The thus-defined power and astigmatism can be experimentally measured on the lens using a frontofocometer; they can also be calculated by ray tracing under wearing conditions.

The invention proposes to consider not only the standard aberrations of the wave front, namely the power and the astigmatism, but to take into account all of the higher order aberrations which affect the wave front.

The invention thus proposes a progressive multifocal ophthalmic lens having the advantages of an excellent perception in dynamic vision and in peripheral vision while limiting the optical aberrations in a central zone of the lens covering the far-vision zone, the near-vision zone and the intermediate-vision zone. The proposed solution also provides a good accessibility to the powers required in near vision, allowing the wearer to see satisfactorily at distances equal to approximately 40 cm without obliging him to lower his eyes very much, the near-vision zone being accessible from 25° below the fitting cross. The lens has a prescription such that the powers prescribed for the wearer in far vision and in near vision are achieved on the lens. The proposed lens is particularly suited to hypermetropic wearers, but it may also be intended for myopic or emmetropic wearers. In each of the figures below, the case of nil power in far vision is considered, which corresponds to emmetropic wearers.

The lens according to the invention is described below with reference to two embodiments and compared with a lens of the prior art which does not satisfy the criteria of the invention (FIGS. 14 to 17).

The lens of FIGS. 4 to 8 is suited to presbyopic wearers having a power progression prescription of 2 diopters.

FIGS. 4 to 8 show a lens of diameter 60 mm with a progressive multifocal front face and comprising a prism of 1.15° with a geometric base orientated at 270° in the TABO reference. The plane of the lens is inclined 8° relative to the vertical and the lens has a thickness of 3 mm. A value of q' of 27 mm (as defined with reference to FIG. 1) was considered for the measurements on the lens of FIGS. 4 to 8.

In FIGS. 5 to 8, the lens is represented in a system with spherical coordinates, the beta angle being plotted on the abscissa and the alpha angle on the ordinates.

The lens has a substantially umbilical line, called a meridian, on which the astigmatism is practically nil. The meridian coincides with the vertical axis in the upper part of the lens and has an inclination on the nasal side in the lower part of the lens, the convergence being more marked in near vision. In the lenses of the applicant, the meridian represents the line of intersection of the viewing and the lens when the wearer looks ahead from a point in the far distance to a target point in near vision.

The figures show the meridian as well as reference points on the lens. The fitting cross FC of the lens can be geometrically marked on the lens by a cross or any other mark such as a point surrounded by a circle produced on the lens, or by any other appropriate means; this is a centring point produced on the lens which is used by the optician to fit the lens in the frame. In spherical coordinates, the fitting cross FC has the coordinates (0,0) as it corresponds to the point of intersection of the front face of the lens and the primary viewing direction, as defined previously. The far-vision control point FV is situated on the meridian and corresponds to a raised viewing of 8° above the fitting cross; the far-vision control point FV has the coordinates (0,−8°) in the predefined spherical reference. The near-vision control point NV is situated on the meridian and corresponds to a lowered viewing of 35° below the fitting cross; the near-vision control point NV has the coordinates (6°,35°) in the predefined spherical coordinate system.

A lens also has a prism reference point PRP corresponding to the geometrical centre of the lens. On the lens of the applicant, the fitting cross FC is situated 8° above the prism reference point; or, in the case of a surface characterization of the lens, 4 mm above the geometrical centre (0,0) of the lens.

Figure 4:
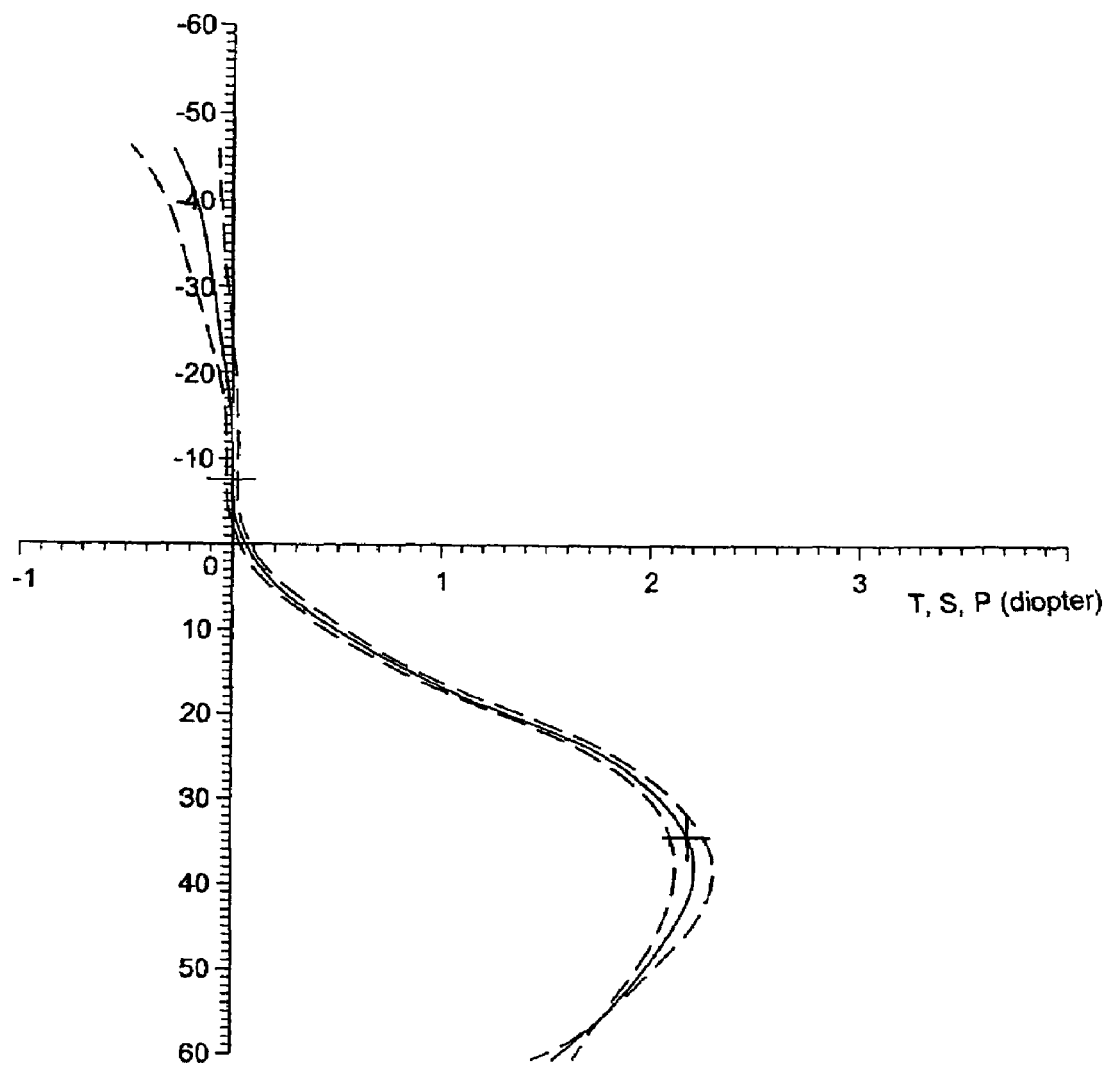
FIG. 4, a graph showing the wearer's optical power along the meridian of a lens according to a first embodiment of the invention.

FIG. 4 shows a graph of the optical power of the wearer along the meridian; the angle $\beta$ is plotted on the ordinates and the power on the abscissa in diopters. The minimum and maximum optical powers corresponding respectively to the quantities 1/JT and 1/JS defined previously are shown by dotted lines, and the optical power P by a solid line.

It is then possible to note in FIG. 4 an optical power of the wearer which is substantially constant around the far-vision control point FV, an optical power of the wearer which is substantially constant around the near-vision control point NV and a regular progression of the power along the meridian. The values are shifted to zero at the origin where the optical power is actually −0.05 diopters corresponding to a lens prescribed for presbyopic emmetropic wearers.

The intermediate-vision zone generally begins, for a progressive multifocal lens, at the fitting cross FC; it is here that the power progression begins. Thus the optical power increases, from the fitting cross to the near-vision control point NV, for values of the angle $\beta$ of 0 to 35°. For angle values beyond 35°, the optical power becomes substantially constant again, with a value of 2.11 diopters. It is noted that the progression of optical power of the wearer (2.17 diopters) is greater than the prescribed power addition A (2 diopters). This difference in power value is due to the oblique effects.

It is possible to define on a lens a progression length PL which is the angular distance—or the difference in ordinates—between the fitting cross FC and a point on the meridian at which the power progression reaches 85% of the prescribed power addition A. In the example of FIG. 4, a progression of optical power of 0.85×2 diopters, i.e. 1.7 diopters, is obtained for a coordinate point of angle $\beta$=approximately 24.5°.

The lens according to the invention thus has a good accessibility to the powers required in near vision with a moderate lowered vision, less than or equal to 25°. This accessibility guarantees comfortable use of the near-vision zone.

Figure 5:
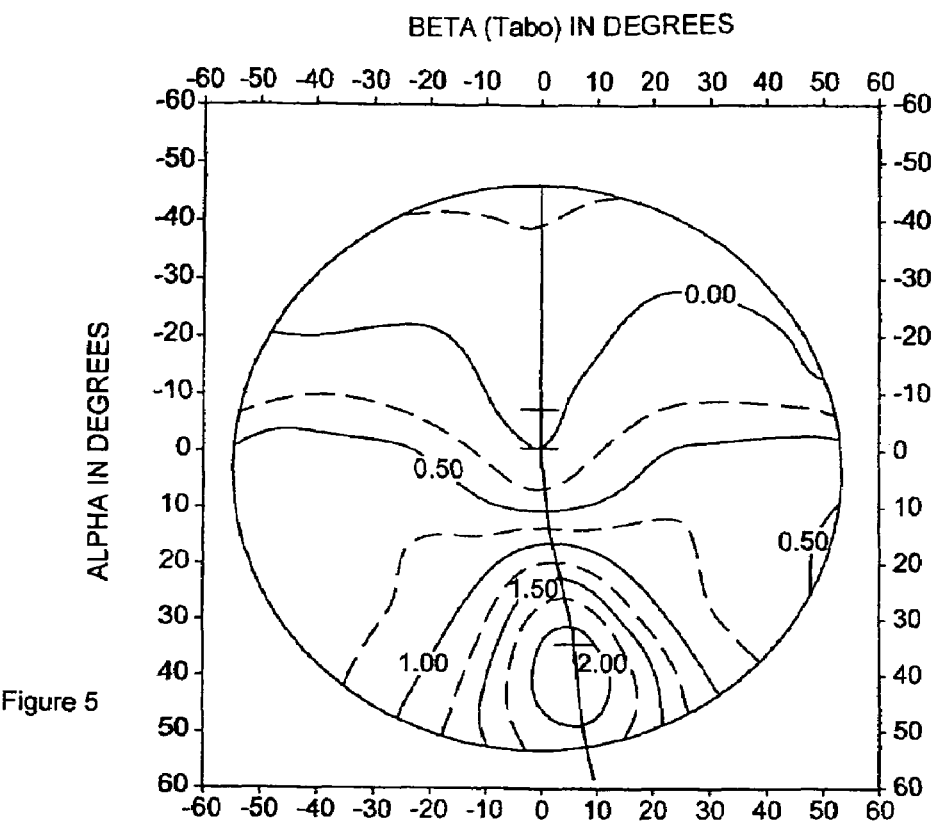
FIG. 5, a map of the wearer's optical power for the lens of FIG. 4.

FIG. 5 shows the contour lines of the optical power of the wearer defined in a direction of viewing and for an object point. As is usual, the isopower lines have been plotted in FIG. 5 in a spherical coordinate system; these lines are formed by the points having the same value of optical power P. The 0 diopter to 2 diopter isopower lines are represented.

Figure 6:
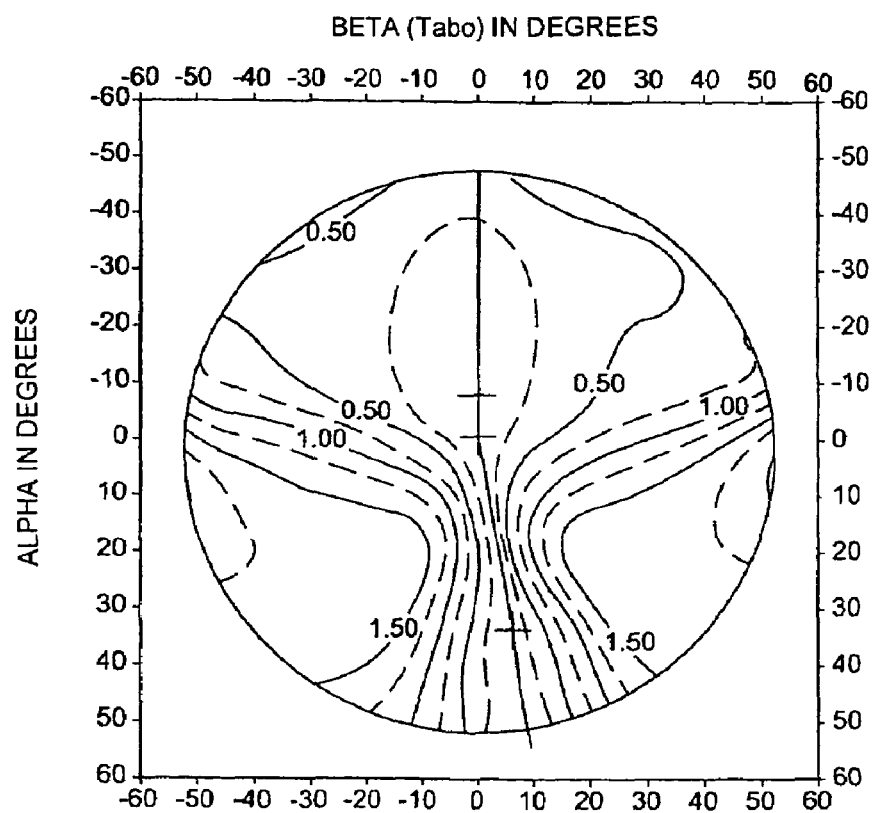
FIG. 6, an oblique astigmatism amplitude map of the lens of FIG. 4.

FIG. 6 shows the contour lines for the amplitude of the oblique astigmatism under conditions when being worn. As is usual, the isoastigmatism lines have been plotted in FIG. 6 in a spherical coordinate system; these lines are formed by the points having the same astigmatism amplitude value as defined previously. The 0.25 diopter to 1.75 diopter isoastigmatism lines are represented.

Figure 7:
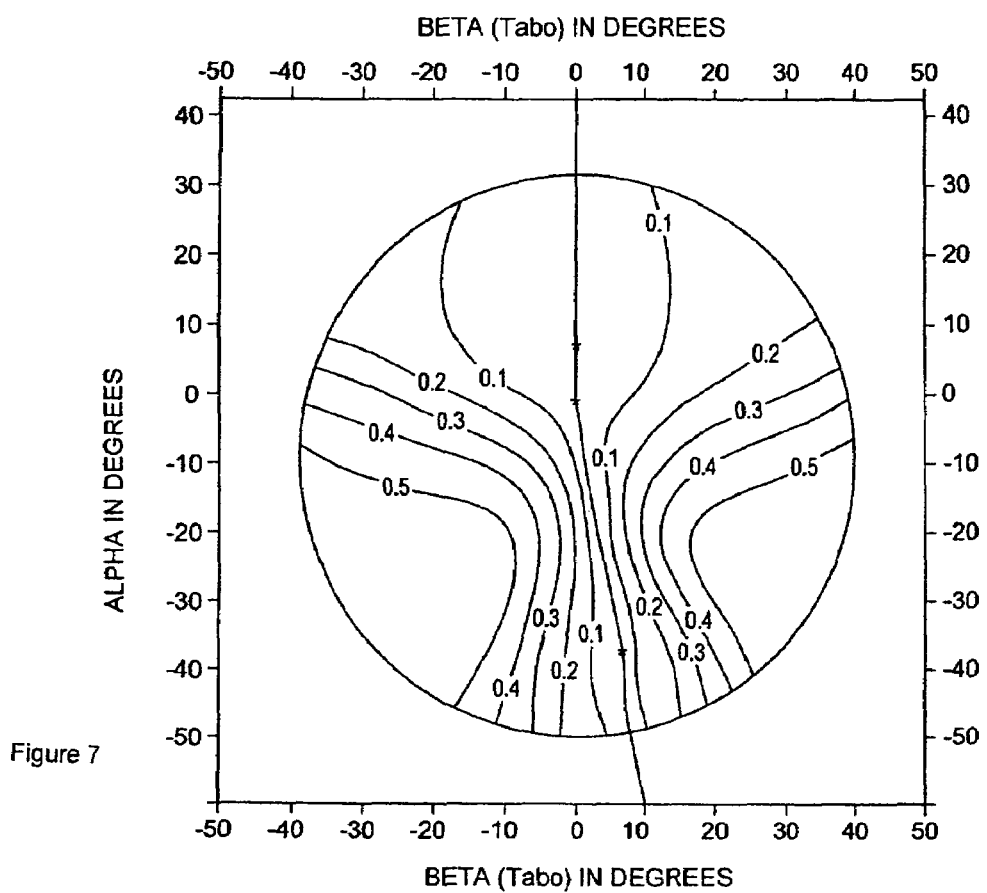
FIG. 7, a map of normalized reduced RMS of the lens of FIG. 4.

FIG. 7 shows the contour lines for the normalized reduced RMS calculated under conditions when being worn. The RMS is calculated for each viewing direction and thus for each point on the glass of the lens, with a ray tracing method. Initially, for each viewing direction and therefore each point of the lens, the wave front is calculated after having passed through the lens and the wearer's prescription—power, axis and amplitude of astigmatism—is subtracted from it in a vectorial manner in order to determine the resulting wave front. A diameter of the wearer's pupil approximately equal to 5 mm was considered. The RMS represents, for each point of the lens corresponding to a viewing direction, the difference between the resulting wave front and a non-aberrant spherical reference wave front corresponding to the desired power for the viewing direction linked to this point of the lens. The RMS values shown in FIG. 7 were calculated for the lens of FIGS. 4 to 6, i.e. for a lens with plane power in far vision and having a prescription for 2 diopter power addition, prescribed for presbyopic emmetropic wearers.

A possible fitting in order to measure the aberrations of a wave front passing through the lens as perceived by the eye of the wearer is described in the article by Eloy A. Villegas and Pablo Artal, "Spatially Resolved Wavefront Aberrations of Ophthalmic Progressive-Power Lenses in Normal Viewing Conditions", Optometry and Vision Science, Vol. 80, No. 2, February 2003.

In a known manner, a wave front which has passed through an aspherical surface can be decomposed by Zernicke polynomials. More precisely, a wave surface can be approximated by a linear combination of polynomials of the type:

$$z(x, y, z) = \Sigma_i a_i p_i 9x, y, z)$$

where the $P_i$ are Zernicke polynomials and the $a_i$ are real coefficients.

The decomposition of the wave front into Zernicke polynomials and the calculation of the aberrations of the wave front were standardized by the Optical Society of America; the standard being available on the web site of Harvard University ftp://color.eri.harvard.edu/standardization/Standards TOPS4.pdf.

The RMS is calculated in this way, under wearing conditions. The RMS is then reduced, i.e. the coefficients of order 1—which correspond to the prismatic effects—and the coefficient of order 2 corresponding to the defocusing in the decomposition of the wave front into Zernicke polynomials are cancelled. The optical aberrations caused by power defects are therefore not included in the calculation of reduced RMS; on the other hand the coefficients of order 2 corresponding to the residual astigmatism of the lens are retained. The RMS is then normalized, i.e. divided by the prescribed power addition.

In FIG. 7, the normalized reduced RMS, expressed in microns per diopter, is represented. The 0.1 μm/D to 0.5 μm/D iso RMS lines are represented. In FIG. 7 a circle is also marked out centred on the prism reference point—i.e. the geometrical centre of the lens before trimming and positioning in a frame. In spherical coordinates, the prism reference point PRP has the coordinates (0,−8°) because it is situated 8° or 4 mm below the fitting cross FC. This circle also has a diameter corresponding to a sweep of vision of 80°—i.e. of approximately 40 mm diameter if a surface characterization of the complex surface of the lens is considered. In the zone of the lens covered by this circle, which includes the far-vision control point FV, the near-vision control point NV and consequently all of the intermediate-vision zone, the normalized reduced RMS is limited to 0.65 μm/D. Imposing a small RMS value over all of this central zone of the lens provides the wearer with optimal comfort of visual perception in peripheral vision and in dynamic vision.

Figure 8:
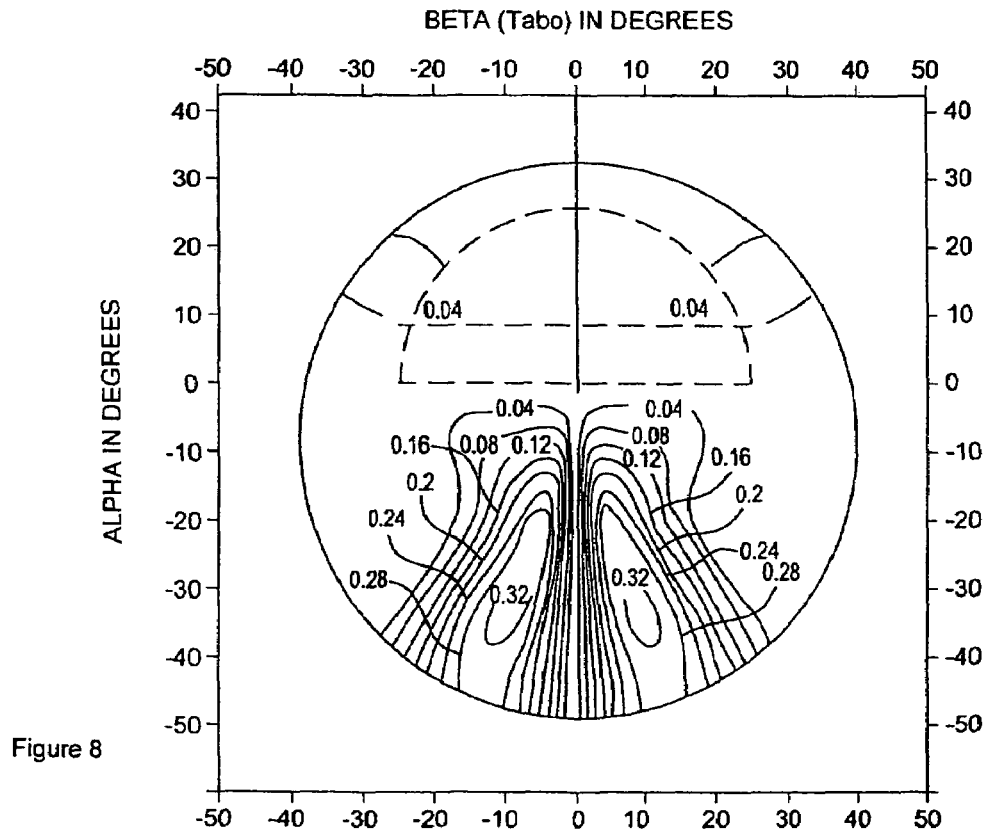
FIG. 8, a map representing the differences in RMS between pairs of symmetrical points of the lens of FIG. 7.

In FIG. 8, contour lines representing the difference in normalized reduced RMS values between symmetrical points relative to a vertical axis passing through the fitting cross FC are represented. The map of FIG. 8 is constructed point by point by considering all the pairs of symmetrical points on either side of the predefined vertical axis and by calculating the difference in normalized reduced RMS between these two points. The absolute value of this difference is then shown on the map of FIG. 8. It is noted that all the normalized reduced RMS isodifference lines are symmetrical relative to this vertical axis passing through the fitting cross FC.

A semi-circle centred on the fitting cross FC and including the far-vision control point is also marked out in FIG. 8. This semi-circle has a radius corresponding to a raised viewing of 25°—i.e. of approximately 12.5 mm radius if a surface characterization of the complex surface of the lens is considered. This semi-circle can have a substantially horizontal base passing through the fitting cross; the base can however be inclined according to the methods of fitting the lens in a frame which depend on the lens manufacturers. The semi-circle defined above must include the far-vision control point FV and the horizontal zone of the lens which is used most often in far vision.

In the zone delimited by this semi-circle, the difference in normalized reduced RMS on either side of the axis of symmetry is less than 0.12 microns per diopter.

The lens according to the invention also has a small difference in normalized reduced RMS between the temporal and nasal parts of the far vision zone. This characteristic ensures optimal wearer comfort in far vision. In fact, when the wearer looks into the distance by shifting his eyes slightly horizontally, he looks through the nasal part of a lens with one eye and through the temporal part of the other lens with the other eye. For good binocular balance it is important that the perspective qualities are substantially the same for both eyes, i.e. that the optical aberrations perceived by each eye are substantially the same. By guaranteeing normalized reduced RMS values which are substantially symmetrical on either side of a vertical axis in far vision it is ensured that the wearer's left eye and right eye encounter substantially the same optical defects, which ensures a good balance of perception between the two eyes.

A substantially horizontal line situated 8° above the fitting cross—i.e. approximately 4 mm above the fitting cross in surface characterization of the lens, is also marked out in FIG. 8. For the lenses of the applicant, this horizontal line therefore passes beneath the far-vision control point as has been defined previously.

In said semi-circle and beneath said horizontal line, the difference in normalized reduced RMS between the nasal and temporal zones is less than 0.12 microns per diopter. This very small difference in normalized reduced RMS value allows optimal comfort in binocular vision because it is this horizontal zone just above the fitting cross which is most used by a wearer when he looks at a point in far vision while moving his eyes laterally behind his lenses.

In FIG. 8 it is seen that the vertical axis of symmetry between the nasal and temporal parts of the lens substantially coincides with the progression meridian in far vision. In fact, in the lenses of the applicant, the progression meridian is defined as the line of vision without lateral movements of the eyes from a target point in far vision to a target point in near vision. It is understood that other definitions can be envisaged for the progression meridian and that the vertical axis of symmetry cannot then coincide with the meridian as is the case in FIG. 8.

The lens of FIGS. 9 to 13 is another example of a lens according to the invention; the lens of FIGS. 9 to 13 is suitable for presbyopic wearers having a prescription for a 2.5 diopter power progression.

FIGS. 9 to 13 show a lens of diameter 60 mm with a progressive multifocal front face and comprising a prism of 1.44° with a geometric base orientated at 270° in the TABO reference. The plane of the lens is inclined 8° relative to the vertical and the lens has a thickness of 3 mm. A value of q' of 27 mm (as defined with reference to FIG. 1) was considered for the measurements on the lens of FIGS. 9 to 13.

Figure 9:
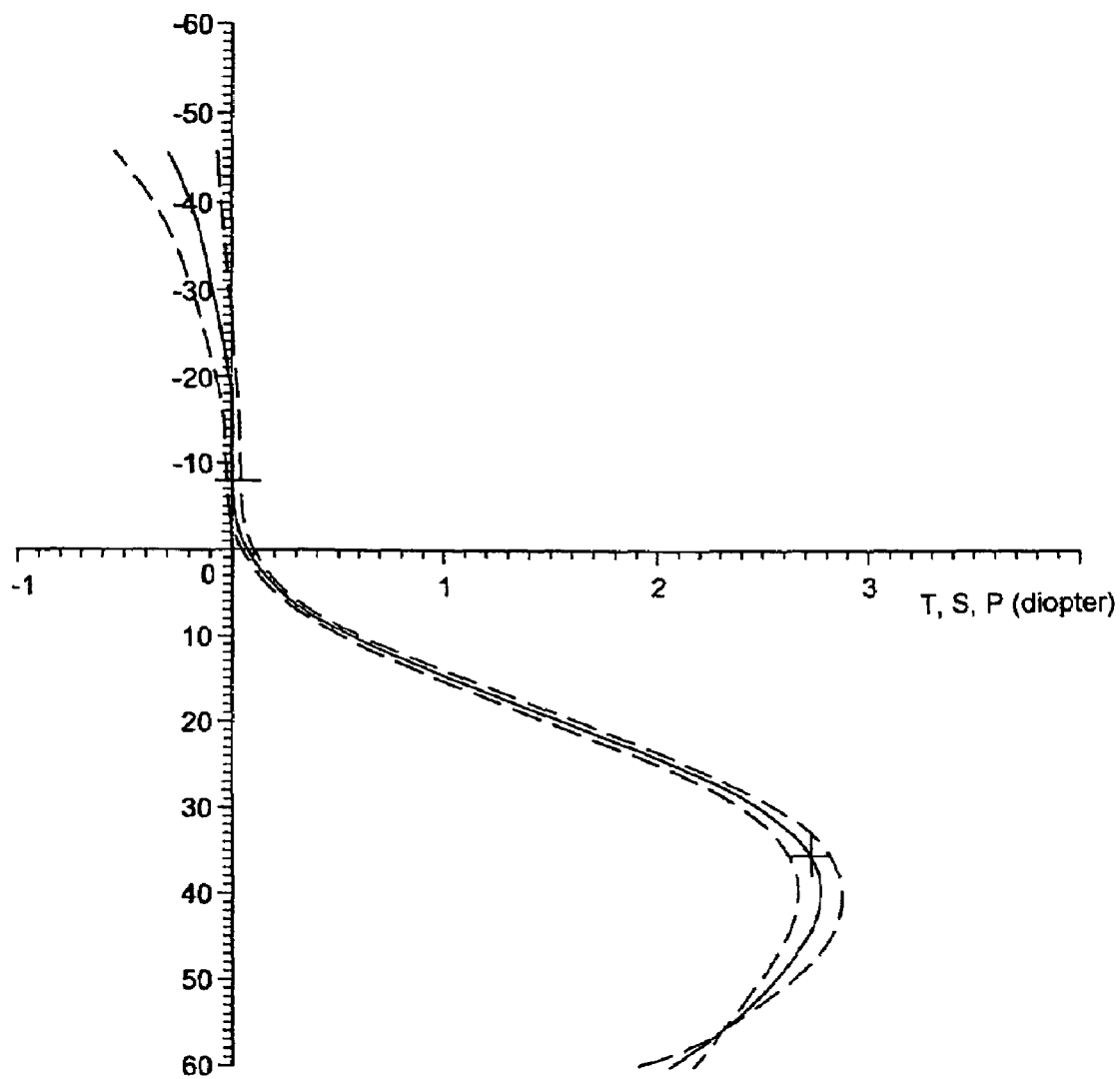
FIG. 9, a graph showing the wearer's optical power along the meridian of a lens according to a second embodiment of the invention.

FIG. 9 shows a graph of the optical power of the wearer along the meridian. The values are shifted to zero at the origin, where the optical power is actually −0.06 diopters corresponding to a plane lens in far vision prescribed for presbyopic emmetropic wearers.

As in FIG. 4, a progression length PL is defined which is the angular distance—or the difference in ordinates—between the fitting cross FC—and a point on the meridian at which the power progression reaches 85% of the prescribed power addition A. In the example of FIG. 9, an optical power progression of 0.85×2.5 diopters, i.e. 2.125 diopters, is obtained for a coordinate point of angle β=approximately 24.50. The lens according to the invention thus has a good accessibility to the powers required in near vision with a moderate lowering of viewing, less than or equal to 25°. This accessibility guarantees comfortable use of the near-vision zone.

Figure 10:
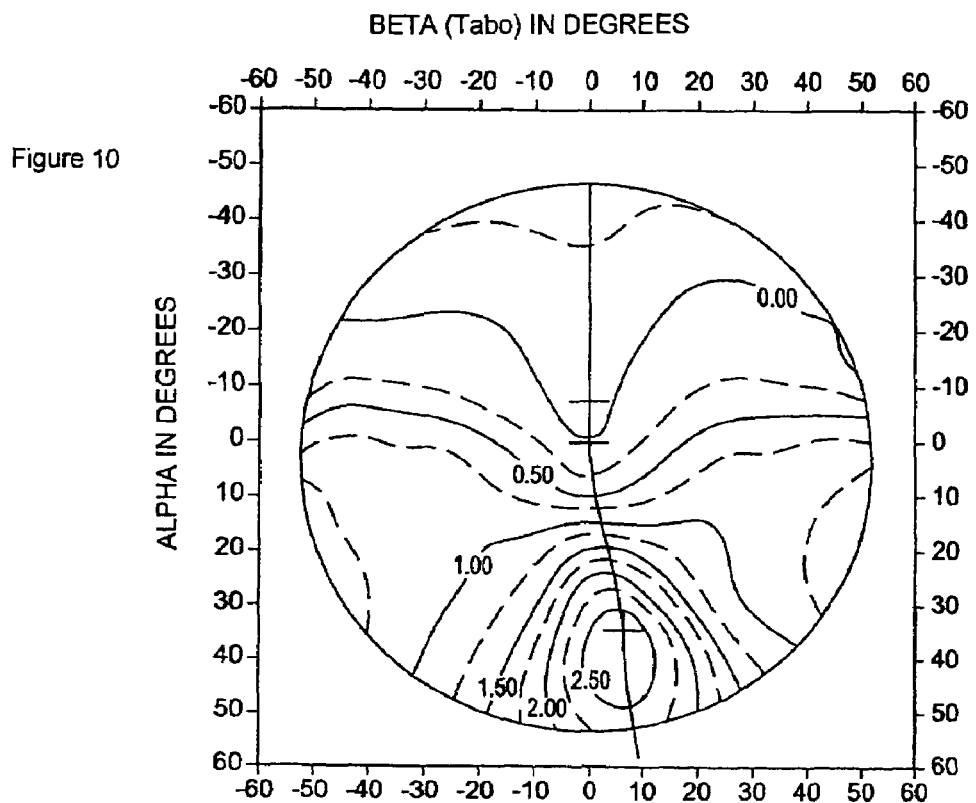
FIG. 10, a map of the wearer's optical power for the lens of FIG. 9.

FIG. 10 shows the contour lines for the optical power of the wearer defined in a viewing direction and for an object point. In FIG. 10, the 0 diopter to 2.50 diopter isopower lines are plotted in a reference with spherical coordinates.

Figure 11:
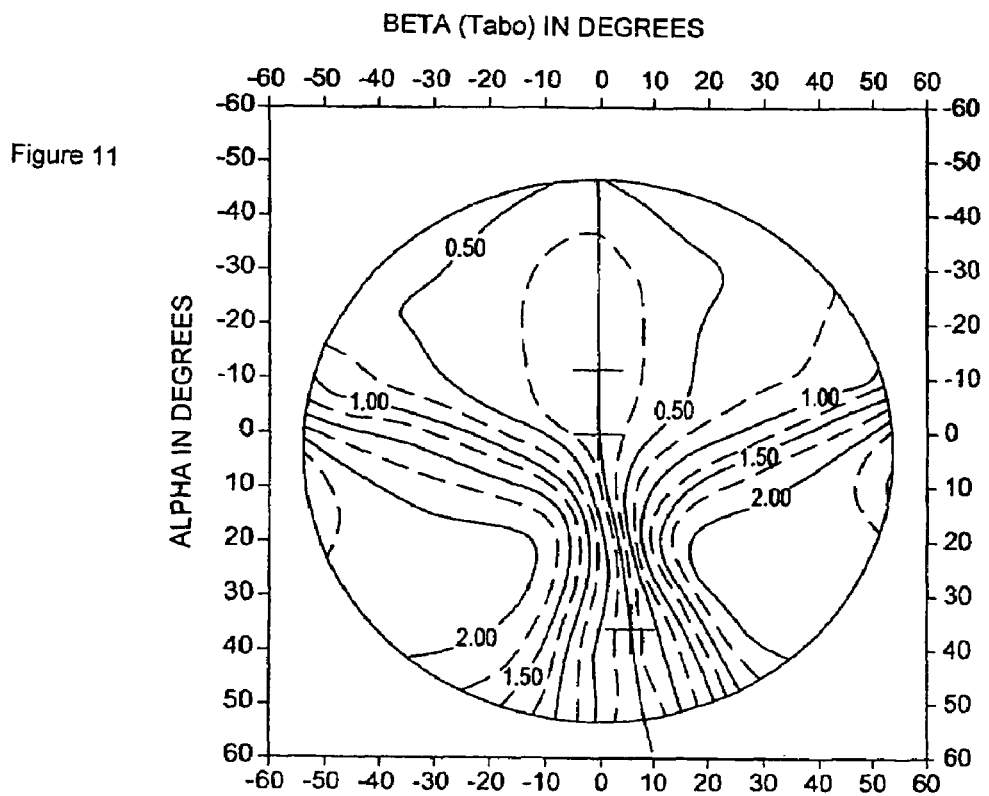
FIG. 11, an oblique astigmatism amplitude map of the lens of FIG. 9.

FIG. 11 shows the contour lines for the amplitude of the oblique astigmatism under wearing conditions. In FIG. 11, the 0.25 diopter to 2.25 diopter isoastigmatism lines are plotted in a reference with spherical coordinates.

Figure 12:
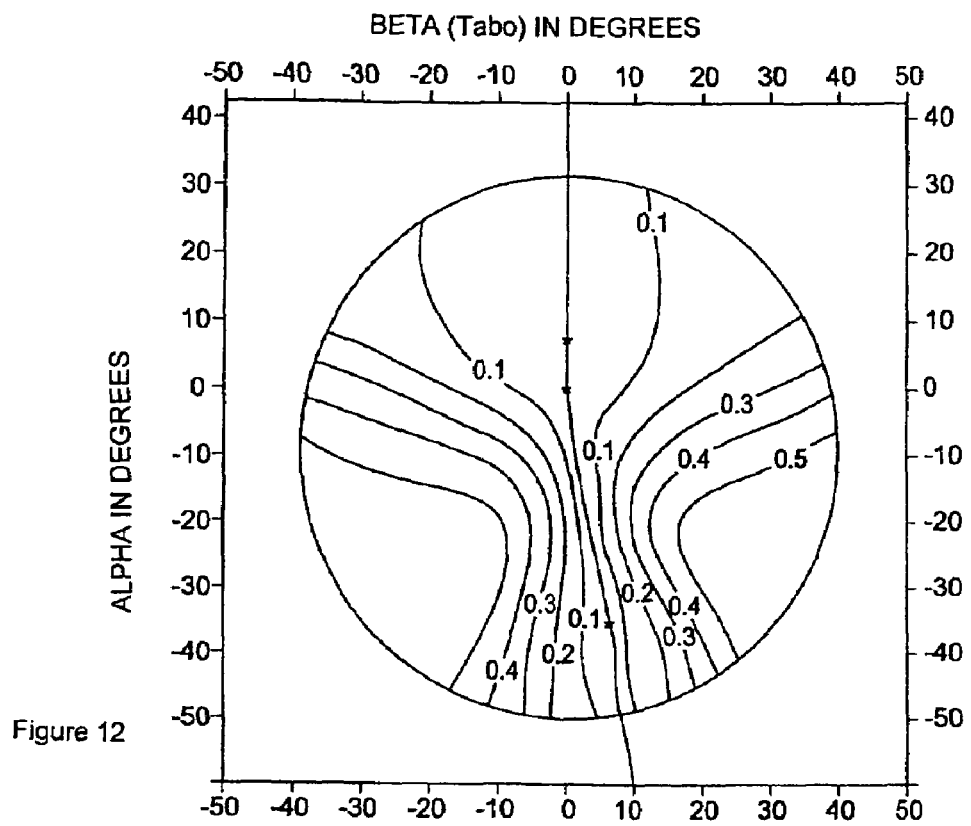
FIG. 12, a map of normalized reduced RMS of the lens of FIG. 9.
Figure 13:
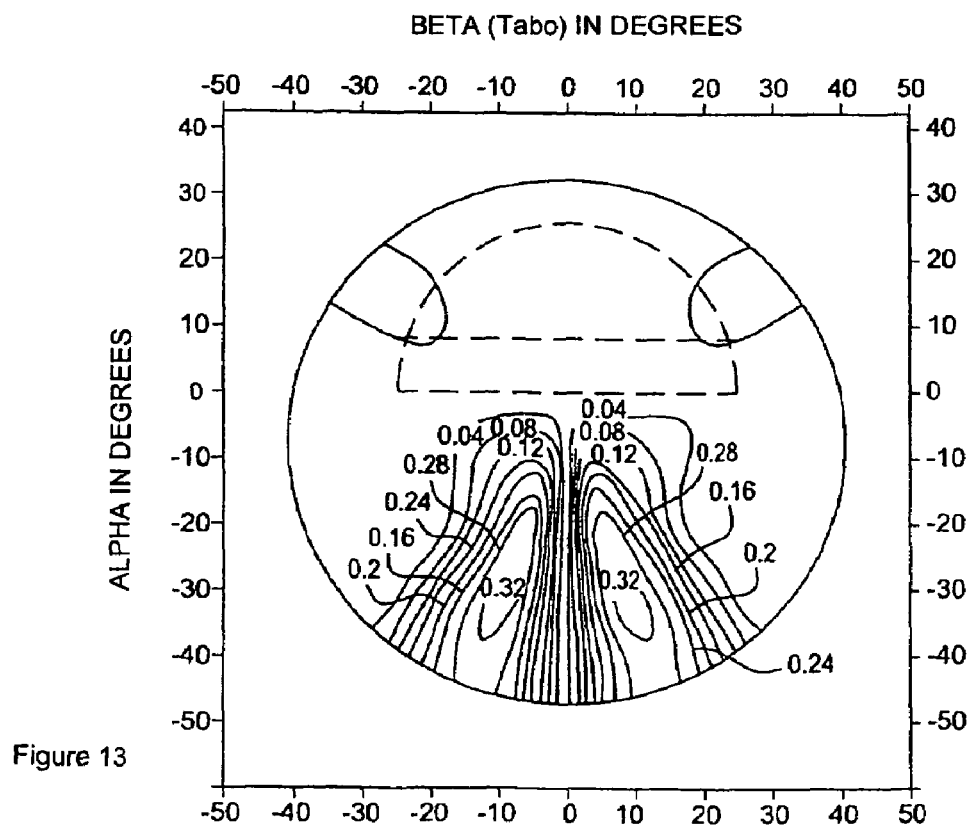
FIG. 13, a map representing the differences in RMS between pairs of symmetrical points of the lens of FIG. 12.
Figure 14:
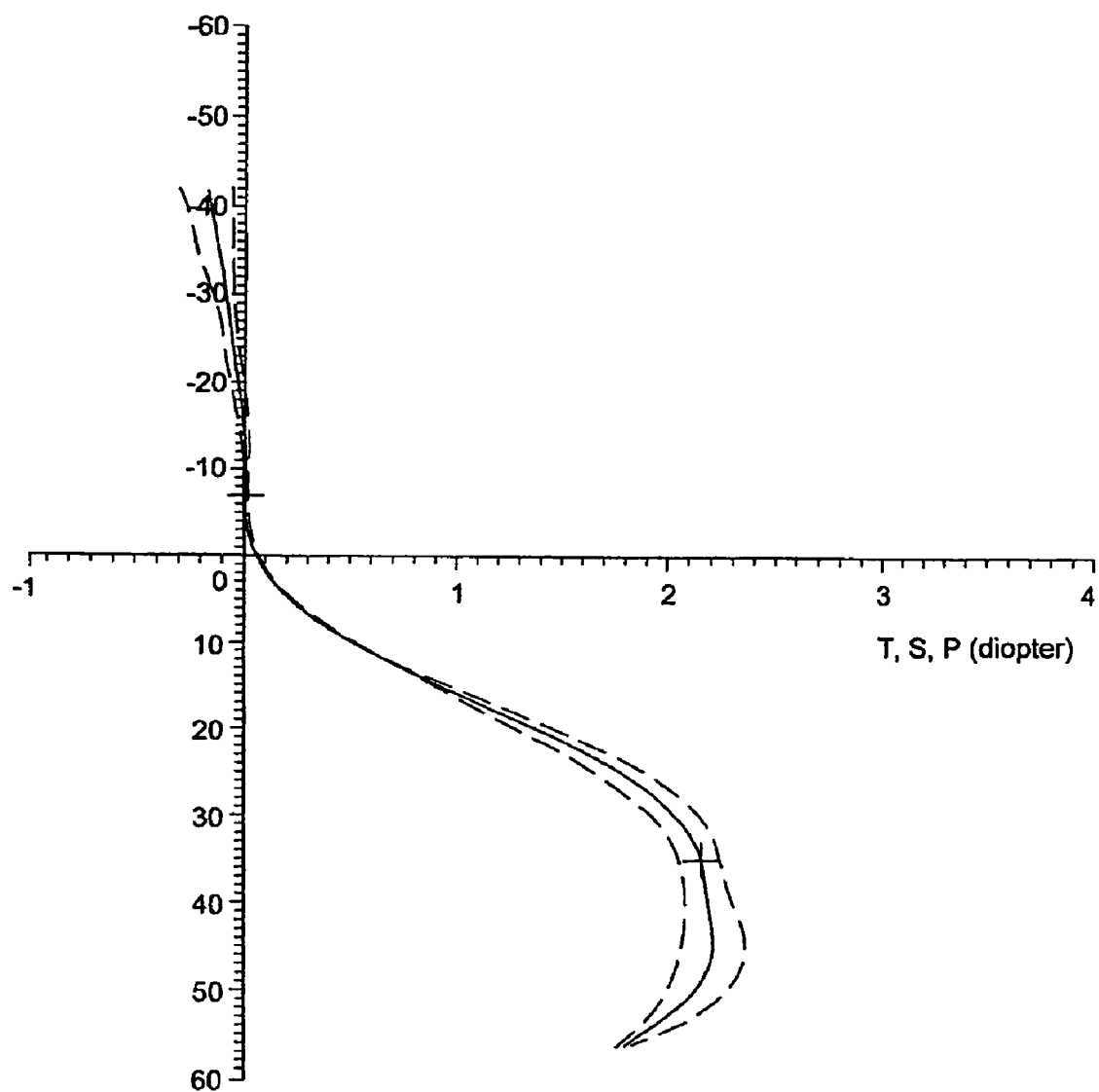
FIG. 14, a graph showing the wearer's optical power along the meridian of a lens according to a prior art.

FIGS. 12 and 13 are similar to FIGS. 7 and 8 described above. It is noted in FIGS. 12 and 13 that the values of normalized reduced RMS and of difference in normalized reduced RMS between nasal and temporal zones depend only to a small extent on the prescribed addition value.

The lens of FIGS. 14 to 17 is an example of a lens of the prior art, marketed by Essilor under the name Varilux Comfort®. The lens of FIGS. 14 to 17 is suitable for presbyopic emmetropic wearers having a prescription for a 2 diopter power progression.

Figure 17:
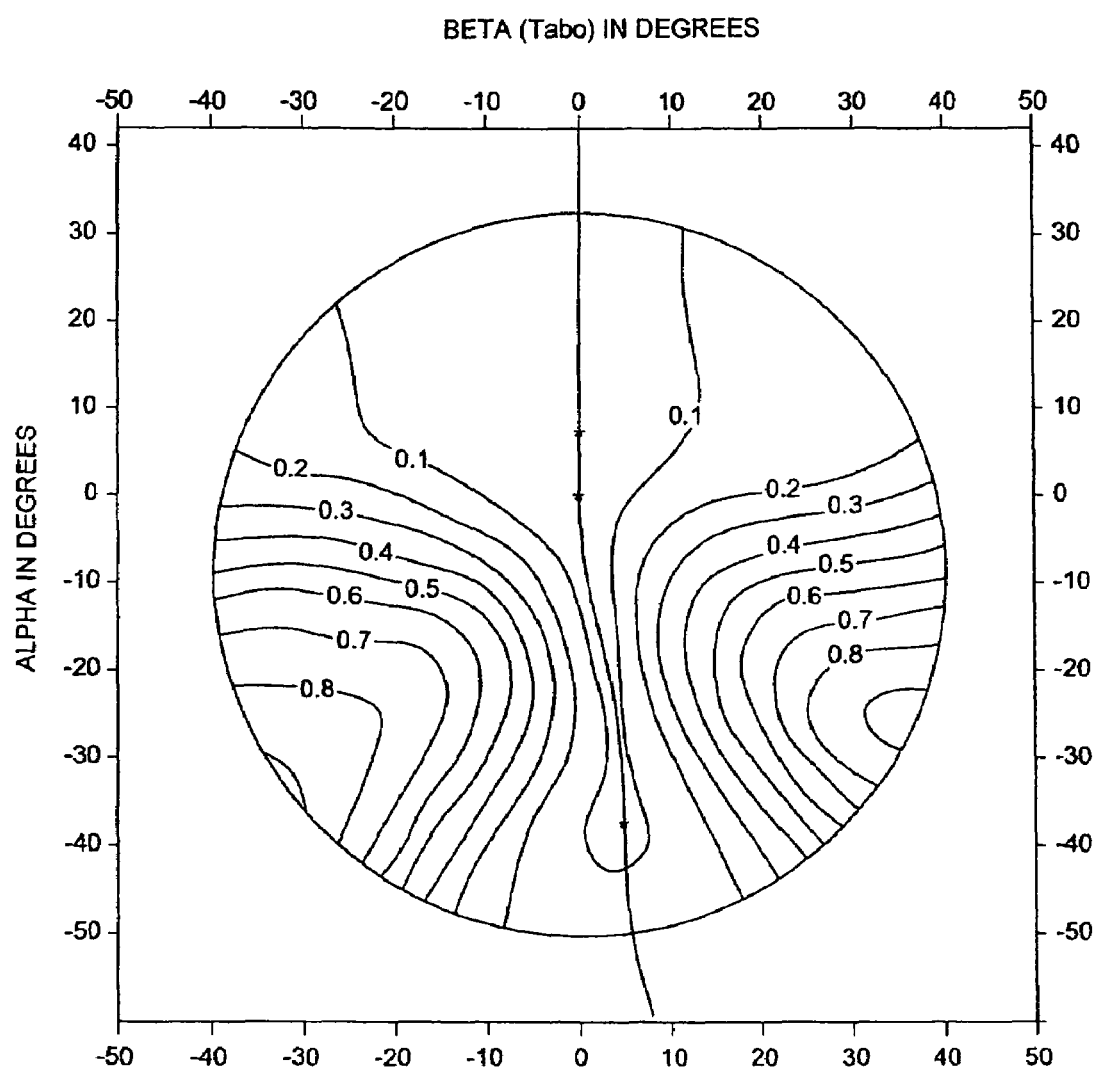
FIG. 17, a map of normalized reduced RMS of the lens of FIG. 14.

FIG. 17 shows the normalized reduced RMS iso lines. It is noted in FIG. 17 that the normalized reduced RMS exceeds the value of 0.65 microns per diopter in the central zone of the lens.

Figure 15:
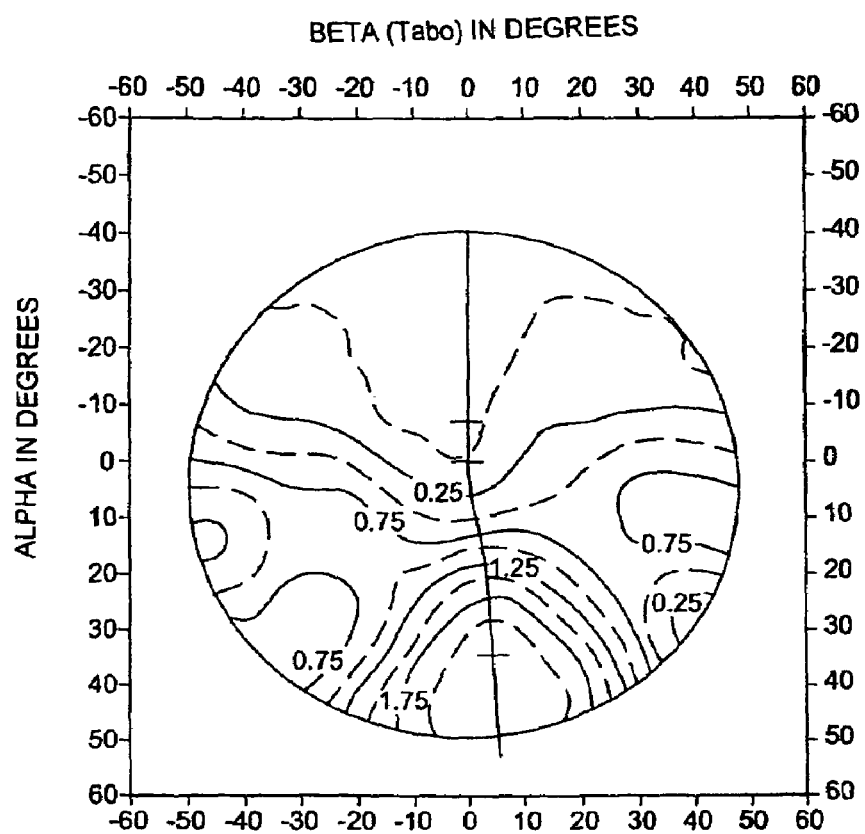
FIG. 15, a map of the wearer's optical power for the lens of FIG. 14.

A smooth and regular variation in the power between the far-vision zone and the near-vision zone compared with FIG. 15 is also noted in FIGS. 5 and 10. This smooth variation makes it possible to limit the optical aberrations, in particular astigmatism, in order to maintain a normalized reduced RMS which is not very great over all of the central zone of the lens as shown in FIGS. 7 and 12 compared with the lens of FIG. 17.

Figure 16:
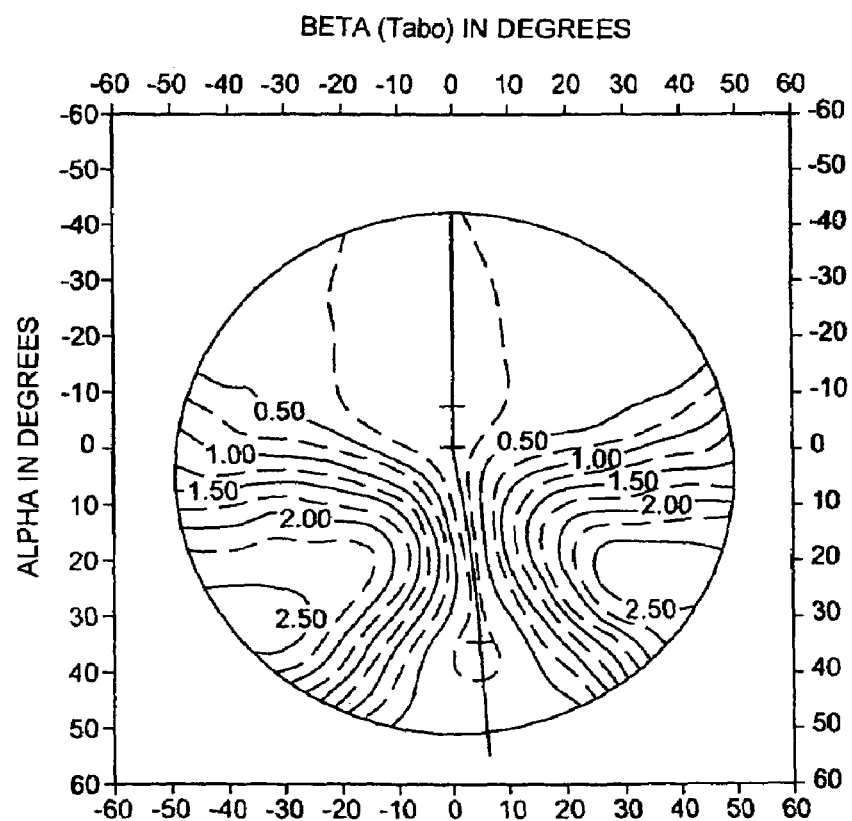
FIG. 16, an oblique astigmatism amplitude map of the lens of FIG. 14.

A regular and symmetrical distribution of the isoastigmatism lines on either side of the meridian as well as lower levels of astigmatism compared with FIG. 16 are also seen in FIGS. 6 and 11. These characteristics of the astigmatism make it possible to limit the optical aberrations and to maintain a normalized reduced RMS which is not very great over all of the central zone of the lens, compared with the lens of FIG. 17.

The lens according to the invention is prescribed by considering the prescriptions of the wearer in far vision and in near vision which determines the necessary addition. When the complex surface is on the front face of the lens, the necessary power can be obtained, as in the state of the art, by machining the rear face in order to ensure that the power is identical to the prescribed power.

The fitting of the lens in a visual device can take place in the following manner. The horizontal position of the wearer's pupil in far vision is measured, i.e. the interpupillary half-distance only, and the overall height of the dimensions of the frame of the visual device is determined. The lens is then fitted in the visual device with the fitting cross positioned in the measured position.

In this regard reference can be made to the patent application FR-A-2 807 169 describing a simplified method for fitting ophthalmic lenses in a frame. This document in particular describes the different measurements made by opticians and proposes to measure only the interpupillary half-distance in order to carry out the fitting of the lenses in the frame using the overall height of the dimensions of the frame.

The fitting of the lens therefore only requires a standard measurement of the interpupillary half-distance for far vision as well as a measurement of the height of the dimensions of the frame in order to determine the height at which the fitting cross must be placed in the frame. The lens is then cut out and fitted in the frame in such a way that the fitting cross is situated in a determined position. The determination of the vertical position of the fitting cross can of course be carried out in a standard manner through measurement of the fitting height by measuring the position in the frame of the subject's vision in far vision; this measurement takes place in a standard manner, the subject wearing the frame and looking into the far distance.

The lens according to the invention allows improved tolerance for the fitting described above. This tolerance is provided by limiting the optical aberrations around the fitting cross. In particular the normalized reduced RMS value and the differences in normalized reduced RMS symmetry are limited around the fitting cross.

The lens described above can be obtained by optimization of a surface according to the optimization methods known per se and described in the above-mentioned documents of the state of the art relating to progressive multifocal lenses. In particular optimization software is used in order to calculate the optical characteristics of the lens-eye system with a predetermined merit function. For the optimization, one or more of the criteria set out in the above description can be used, and in particular:

a reduced RMS normalized to the addition prescription of less than 0.65 microns per diopter, in a zone delimited by a circle centred on the prism reference point PRP and with a diameter corresponding to a sweep of vision of 80°.

a progression length less than or equal to 25°, a difference in normalized reduced RMS of less than 0.12 microns per diopter, calculated in absolute values as the difference in normalized reduced RMS values between pairs of symmetrical points relative to a vertical axis passing through the fitting cross, in a zone including the far-vision control point FV and delimited by a semi-circle centred on the fitting cross FC and with a radius corresponding to raising viewing by 25°.

These criteria can be combined with others and in particular with a difference in normalized reduced RMS of less than or equal to 0.12 microns per diopter below a substantially horizontal line situated 8° above the fitting cross.

The choice of these criteria makes it possible to obtain a lens by optimization. A person skilled in the art readily understands that the lens in question does not necessarily have values corresponding exactly to the set criteria; for example, it is not essential for the upper value of the normalized reduced RMS to be obtained.

In the above examples of optimization it is proposed to optimize only one of the faces of the lenses. It is clear that in all of these examples, the roles of the front and rear surfaces can easily be switched once optical targets similar to those of the lens described are obtained.

What is claimed is:

1. Progressive multifocal ophthalmic lens with a complex surface having:
   a prism reference point;
   a fitting cross situated 8° above the prism reference point;
   a substantially umbilical progression meridian having a power addition greater than or equal to 1.5 diopters between a far-vision reference point and a near-vision reference point;
   the lens having, under wearing conditions and with reference to a plane prescription in far vision by adjustment of the radii of curvature of at least one of its faces:
   a reduced root mean square, normalized to the addition prescription, of less than 0.65 microns per diopter, in a zone delimited by a circle centred on the prism reference point and with a diameter corresponding to a sweep of vision of 80°, the reduced root mean square being calculated by cancelling the coefficients of order 1 and the coefficient of order 2 corresponding to the defocusing in the decomposition into Zernicke polynomials of a wave front passing through the lens;
   a progression length less than or equal to 25°, the progression length being defined as the angle of lowered viewing from the fitting cross to the point of the meridian at which the wearer's optical power reaches 85% of the addition prescription;
   a normalized reduced root mean square difference of less than 0.12 microns per diopter calculated in absolute values as the difference in root mean square values between pairs of symmetrical points relative to a vertical axis passing through the fitting cross, in a zone which includes the far-vision control point and delimited by a semi-circle centred on the fitting cross and with a radius corresponding to a raised viewing of 25°.

2. The lens of claim 1, characterized in that said root mean square difference between two symmetrical points in said semi-circle is less than or equal to 0.12 microns per diopter below a substantially horizontal line situated 8° above the fitting cross.

3. The lens of claim 1, characterized in that the semi-circle has a substantially horizontal base passing through the fitting cross.

4. The lens of claim 1, characterized in that the axis of symmetry of the semi-circle substantially coincides with the progression meridian.

5. A visual device including at least one progressive multifocal ophthalmic lens with a complex surface having:
   a prism reference point;
   a fitting cross situated 8° above the prism reference point;
   a substantially umbilical progression meridian having a power addition greater than or equal to 1.5 diopters between a far-vision reference point and a near-vision reference point;
   the lens having, under wearing conditions and with reference to a plane prescription in far vision by adjustment of the radii of curvature of at least one of its faces:
   a reduced root mean square, normalized to the addition prescription, of less than 0.65 microns per diopter, in a zone delimited by a circle centred on the prism reference point and with a diameter corresponding to a sweep of vision of 80°, the reduced root mean square being calculated by cancelling the coefficients of order 1 and the coefficient of order 2 corresponding to the defocusing in the decomposition into Zernicke polynomials of a wave front passing through the lens;
   a progression length less than or equal to 25°, the progression length being defined as the angle of lowered viewing from the fitting cross to the point of the meridian at which the wearer's optical power reaches 85% of the addition prescription;
   a normalized reduced root mean square difference of less than 0.12 microns per diopter calculated in absolute values as the difference in root mean square values between pairs of symmetrical points relative to a vertical axis passing through the fitting cross, in a zone which includes the far-vision control point and delimited by a semi-circle centred on the fitting cross and with a radius corresponding to a raised viewing of 25°.

6. A method for correcting the vision of a presbyopic subject, which comprises providing the subject with, or the wearing by the subject of, a visual device including at least one progressive multifocal ophthalmic lens with a complex surface having:
   a prism reference point;
   a fitting cross situated 8° above the prism reference point;
   a substantially umbilical progression meridian having a power addition greater than or equal to 1.5 diopters between a far-vision reference point and a near-vision reference point;
   the lens having, under wearing conditions and with reference to a plane prescription in far vision by adjustment of the radii of curvature of at least one of its faces:
   a reduced root mean square, normalized to the addition prescription, of less than 0.65 microns per diopter, in a zone delimited by a circle centred on the prism reference point and with a diameter corresponding to a sweep of vision of 80°, the reduced root mean square being calculated by cancelling the coefficients of order 1 and the coefficient of order 2 corresponding to the defocusing in the decomposition into Zernicke polynomials of a wave front passing through the lens;
   a progression length less than or equal to 25°, the progression length being defined as the angle of lowered viewing from the fitting cross to the point of the meridian at which the wearer's optical power reaches 85% of the addition prescription;
   a normalized reduced root mean square difference of less than 0.12 microns per diopter calculated in absolute values as the difference in root mean square values between pairs of symmetrical points relative to a vertical axis passing through the fitting cross, in a zone which includes the far-vision control point and delimited by a semi-circle centred on the fitting cross and with a radius corresponding to a raised viewing of 25°.

* * * * *